US008759683B2

(12) United States Patent
Ko et al.

(10) Patent No.: US 8,759,683 B2
(45) Date of Patent: Jun. 24, 2014

(54) SPARK-OVER PREVENTION DEVICE FOR HIGH-VOLTAGE BUSHING

(75) Inventors: Chungduck Ko, Mendon, NY (US); Shibao Zhang, Rochester, NY (US); Eric R. Weatherbee, Attica, NY (US); Andrew V. McNulty, Batavia, NY (US); Kata Cirkovic, West Henrietta, NY (US)

(73) Assignee: Hubbell Incorporated, Shelton, CT (US)

(*) Notice: Subject to any disclaimer, the term of this patent is extended or adjusted under 35 U.S.C. 154(b) by 362 days.

(21) Appl. No.: 13/184,109

(22) Filed: Jul. 15, 2011

(65) Prior Publication Data

US 2013/0014986 A1 Jan. 17, 2013

(51) Int. Cl.

| | |
|---|---|
| ***H01B 17/26*** | (2006.01) |
| ***H01B 17/58*** | (2006.01) |
| ***H01B 17/00*** | (2006.01) |
| ***H01B 17/54*** | (2006.01) |
| ***H02G 3/18*** | (2006.01) |

(52) U.S. Cl.

USPC ........ 174/142; 174/152 R; 174/154; 174/167; 174/650; 174/137 R

(58) Field of Classification Search

CPC ........ H01B 17/28; H01B 17/26; H01B 17/42; H01B 17/16; H01B 17/301; H01B 17/00; H01B 17/12; H01B 17/20; H01B 17/005; H01B 17/30; H01B 17/308; H01B 17/306; H01B 17/303; H01B 17/305; H01B 17/24; H01B 17/145; H01B 13/5804; G02B 6/442; H02G 3/22; H02G 15/013; H02G 3/24; H02G 3/088; H02G 3/0468; H02G 3/0691; H02G 3/083; H02G 3/0683; H02G 3/0616; B65H 2701/34; B60R 16/0222; F16L 5/14

USPC ............ 174/152 R, 154, 650, 656, 665, 520, 174/142, 140, 139, 151, 167, 137 R, 11 BH, 174/12 BH, 13 BH; 361/212

See application file for complete search history.

(56) References Cited

U.S. PATENT DOCUMENTS

| | | | | |
|---|---|---|---|---|
| 3,884,542 | A | 5/1975 | Flatt | |
| 4,773,872 | A * | 9/1988 | Borgstrom et al. | 439/185 |
| 4,965,407 | A | 10/1990 | Hamm | |
| 6,150,613 | A | 11/2000 | Bergstrom | |
| 6,194,986 | B1 | 2/2001 | Weatherbee | |
| 6,848,922 | B2 | 2/2005 | Coughlan | |
| 6,951,987 | B1 * | 10/2005 | Hansen et al. | 174/142 |
| 7,582,836 | B2 * | 9/2009 | Tapper | 174/650 |
| 2002/0104679 | A1 | 8/2002 | Krol | |
| 2010/0018753 | A1 * | 1/2010 | Larsson et al. | 174/152 R |

* cited by examiner

*Primary Examiner* — Jenny L Wagner
*Assistant Examiner* — Ahmad D Barnes
(74) *Attorney, Agent, or Firm* — Alfred N. Goodman; Mark S. Bicks

(57) ABSTRACT

A high-voltage bushing includes a housing and a tube disposed within the housing. A conductor is disposed within the tube. An electrically conductive contact member is connected to the tube and has a first opening to receive and contact the conductor. Accordingly, spark-over between the inner surface of the tube and the outer surface of the draw-lead cable caused by a high-frequency transient is substantially prevented.

20 Claims, 6 Drawing Sheets

SPARK-OVER PREVENTION DEVICE FOR HIGH-VOLTAGE BUSHING

FIELD OF THE INVENTION

The present invention relates to a spark-over prevention device for a high-voltage bushing. More particularly, the present invention relates to a spark-over prevention device for a draw-lead high-voltage bushing. Still more particularly, the present invention relates to an electrically conductive contact member connected to a draw-lead cable and a bushing tube substantially eliminating a potential difference between the draw-lead cable and the draw-lead tube to substantially prevent spark-over therebetween.

BACKGROUND OF THE INVENTION

Electricity is transferred through electrical power systems at high-voltage levels of typically 15 kV to 500 kV. A power transformer steps up and down the voltages. A high-voltage bushing is the interface between the transformer winding and external power lines.

The high-voltage bushing is a hollow insulator through which a conductor passes. Each end of the conductor is connected to electrical equipment. For example, as noted above, the high-voltage bushing can be used to transition a power line into a transformer. The high-voltage bushing provides electrical isolation of power line conductors in transmission and distribution, substation, transformer, capacitor and power protection applications.

The top of the bushing is connected to the power line. There are several ways to connect the transformer winding to the external power lines with the high-voltage bushing. The winding cable can be connected to the bottom of the bushing conductor inside the transformer, which is a bottom connection. Alternatively, the winding cable (or "draw-lead cable) can be pulled through the inside of the bushing hollow tube and connected to the top of the bushing, which is a draw-lead connection. Another alternative is to partially replace the draw-lead cable with a rod.

To connect the draw-lead bushing to a transformer in the factory, an end of the draw-lead cable is connected to a draw-lead terminal. The bushing is lifted up with a crane vertically and lowered with its bottom close to, but still above, the transformer turret (opening). A long string or rope is usually dropped down through the bushing hollow tube and tightened to the draw-lead terminal. As the bushing is further lowered down into the transformer, the string is pulled up to guide the draw-lead cable through the bushing tube. A gasket, or o-ring, is disposed between the bushing flange and the transformer tank. The bushing flange is then bolted to the transformer turret, and the draw-lead terminal is connected to the top of the bushing. The top of the bushing (such as a top terminal) is then connected to the external power line or testing cable.

To remove the high-voltage bushing for shipment of the transformer, the draw-lead terminal is disconnected from the bushing top, the draw-lead cable lowered into the transformer, the bushing flange unbolted, and the bushing removed from the transformer. The same installation process described above is followed to connect the high-voltage bushing in the field, except that the draw-lead cable is already connected to the draw-lead terminal such that the installer does not need to be inside the transformer.

In a draw-lead bushing, the draw-lead cable or draw-lead rod has full contact with the bushing top, either directly to the top of the bushing tube or through a conductor to the top of the bushing tube. However, the bottom of the draw-lead cable or rod does not have full contact with the bushing tube, especially when the draw-lead cable is insulated.

One problem associated with a high-voltage bushing is spark-over, or arcing, between the draw-lead cable conductor and the inner surface of the hollow tube of the bushing through which the conductor passes, thereby resulting in failure of the bushing. The spark-over can be caused by a high-frequency, or fast front, transient. Two causes of high-frequency transients are lightning induced insulator spark-overs and circuit switching. The surge wave created by the high-frequency transient travels to the bushing top and splits into the bushing tube and the draw-lead cable. The split waves travel along the two separate paths with different speeds and reflect differently, thereby creating a large potential difference between the adjacent positions on the bushing tube and the draw-lead cable. The large potential difference results in the arcing or spark-over between the two bushing tube and the draw-lead cable, thereby resulting in failure of the high-voltage bushing. These failures are often explosive and can result in fires. Additional insulation has been added to the draw-lead cable to prevent spark-over, but has not proved effective.

A conventional draw-lead cable bushing 11 is shown in FIGS. 1 and 2. A flange 13 connects the bushing 11 to electrical equipment, such as a transformer 111 (FIG. 3). A housing 15 is connected to the flange 13 and is exposed externally of the electrical equipment to which the bushing 11 is connected. A hollow bushing tube 17 passes through the bushing 11 from a first end 16 to a second end 18. A draw-lead conductor 21 is connected at a first end to the transformer windings disposed within the core 113 (FIG. 3). A draw-lead terminal 23 is connected to a second end of the draw-lead cable 21. The rope 25 is connected to draw-lead terminal 23 to guide the draw-lead cable through the bushing tube 17. A locking pin 27 is passed through the bushing tube 17 and the draw-lead terminal 23 to secure the draw-lead cable 21 to the first end 16, or top, of the bushing 11. The rope 25 is then disconnected from the draw-lead terminal 23, as shown in FIG. 2. As shown in FIG. 2, the draw-lead cable 21 has electrical contact with the bushing tube 17 at the upper end of the assembled high-voltage bushing 11. However, there is no electrical contact at the lower end of the bushing 11. The potential difference between the inner surface 29 of the bushing tube 17 and the outer surface 31 of the draw-lead cable 21 caused by a high-frequency transient surge wave can cause a spark-over between the bushing tube and cable, thereby resulting in failure of the high-voltage bushing 11.

Thus, there is a continuing need to provide a spark-over prevention device for a high-voltage bushing.

SUMMARY OF THE INVENTION

Accordingly, it is a primary objective of the present invention to provide an improved spark-over prevention device for a high-voltage bushing.

A further objective of the present invention is to provide an improved spark-over prevention device that substantially eliminates spark-overs between a draw-lead cable and a bushing tube of a high-voltage bushing.

The foregoing objectives are basically attained by a high-voltage bushing having a spark-over prevention device. A tube is disposed within a housing of the high-voltage bushing. A conductor is disposed within the tube. An electrically conductive contact member is connected to the tube and has a first opening to receive and contact the conductor. Accordingly, spark-over between the inner surface of the tube and the outer surface of the draw-lead cable caused by a high-frequency transient is substantially prevented.

The foregoing objectives are also basically attained by a method of assembling a high-voltage bushing. An electrically conductive contact member is connected to a tube of a high-voltage bushing proximal a second end of the tube. A conductor is connected to a first end of the tube. The conductor is contacted with the metallic contact member, thereby substantially preventing spark-over between the conductor and the tube.

Other objects, advantages and salient features of the invention will become apparent from the following detailed description, which, taken in conjunction with the annexed drawings, discloses a preferred embodiment of the invention.

As used in this application, the terms “front,” “rear,” “upper,” “lower,” “upwardly,” “downwardly,” and other orientational descriptors are intended to facilitate the description of the spark-over prevention device, and are not intended to limit the structure of the spark-over prevention device to any particular position or orientation.

BRIEF DESCRIPTION OF THE DRAWINGS

The above aspects and features of the present invention will be more apparent from the description for an exemplary embodiment of the present invention taken with reference to the accompanying drawings, in which.

Throughout the drawings, like reference numerals will be understood to refer to like parts, components and structures.

DETAILED DESCRIPTION OF EXEMPLARY EMBODIMENTS

Figure 1:
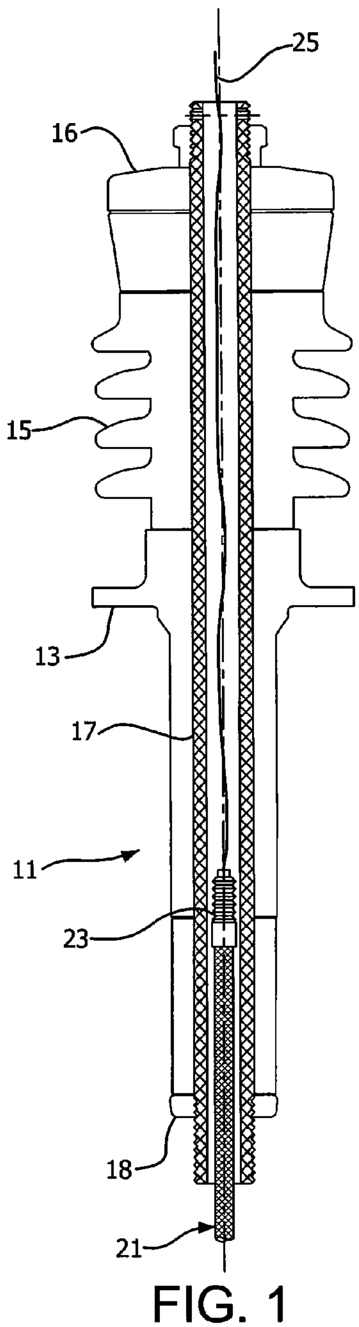
FIG. 1 PRIOR ART
FIG. 1 is a side elevational view in section of a conventional draw-lead connected high-voltage bushing prior to installation of a draw-lead cable.
Figure 2:
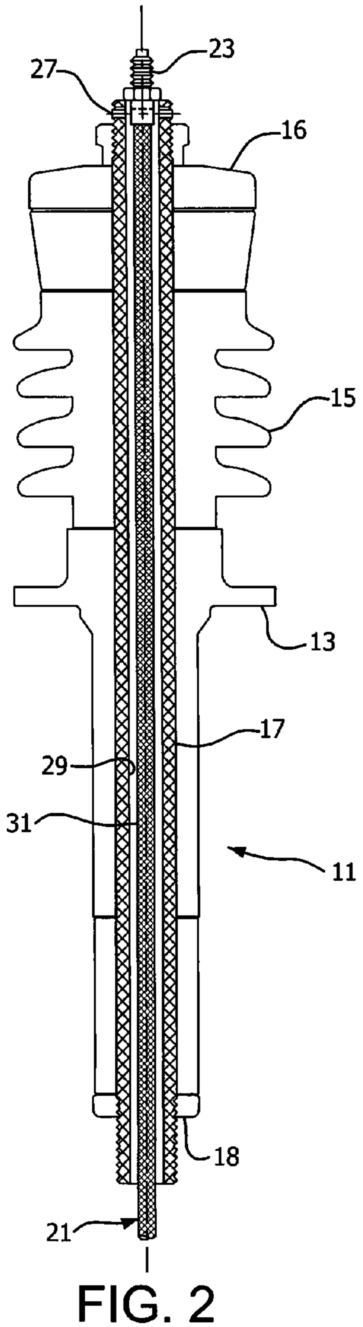
FIG. 2 PRIOR ART
FIG. 2 is a side elevational view in section of the bushing of FIG. 1 after installation of the draw-lead cable.

As shown in FIGS. 3-8, an exemplary embodiment of the present invention includes a spark-over prevention device 151 for a high-voltage bushing 121. An electrically conductive tube 131 is disposed within an electrically insulating housing 123 of the high-voltage bushing 121. A conductor 141 is disposed within the tube 131. The spark-over prevention device is a metallic contact member 151 is connected to the tube 131 and has a first opening 153 to receive and directly contact the conductor 141. Accordingly, spark-over between the inner surface 133 of the tube 131 and the outer surface 143 of the draw-lead cable 141 caused by a high-frequency transient is substantially prevented.

Figure 3:
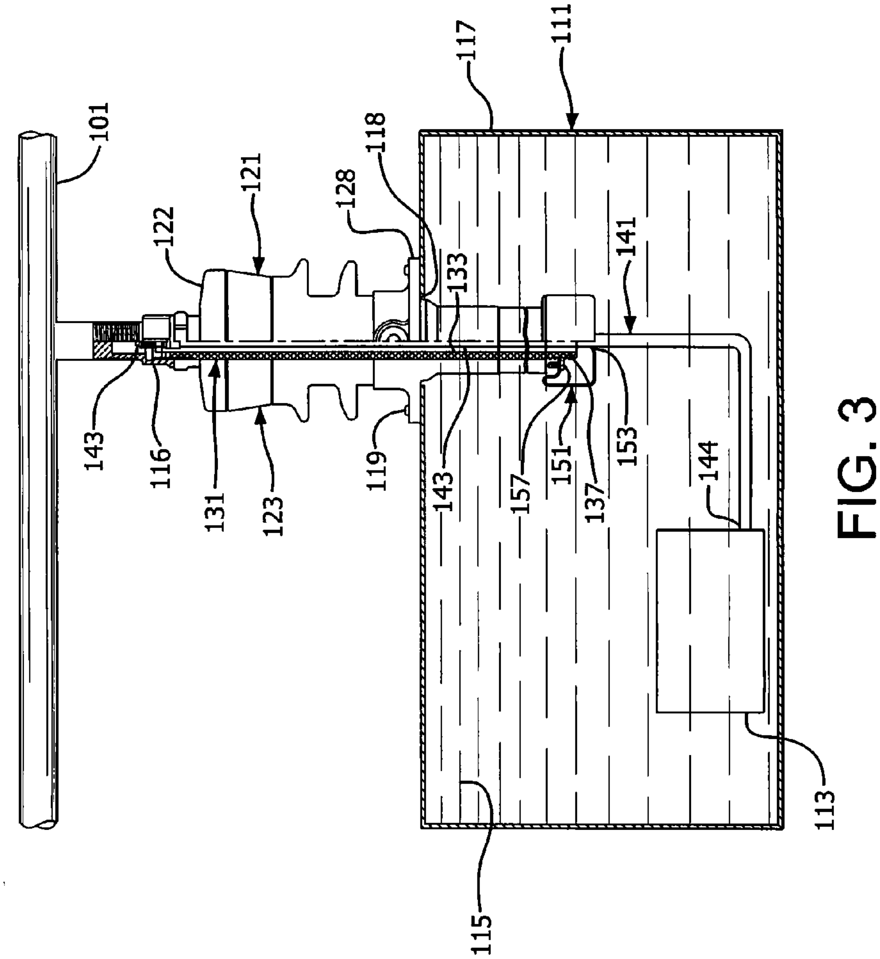
FIG. 3 is a side elevational view in section of a draw-lead connected high-voltage bushing in accordance with an exemplary embodiment of the present invention connected to a transformer.
Figure 4:
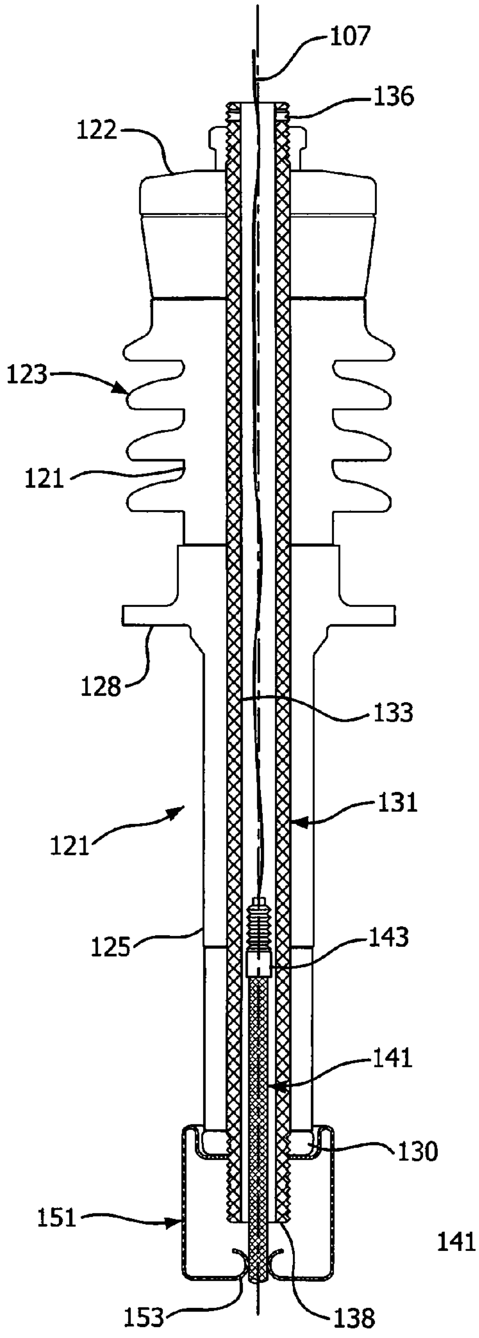
FIG. 4 is a side elevational view in section of a draw-lead cable high-voltage bushing prior to installation of a draw-lead cable in accordance with a first exemplary embodiment of the present invention.

As described above, the draw-lead high-voltage bushing 121 in accordance with exemplary embodiments connects a winding, or draw-lead, cable 141 from a transformer coil and core assembly 113 to a power line 101, as shown in FIG. 3. The core 113 is immersed in oil 115 within a housing 117 of the transformer 111. An upper terminal 116 of the bushing 121 is connected to the power line 101. The draw-lead cable 141 is pulled through the inside of the bushing tube 131 and connected to the upper terminal 116 of the bushing 121. Alternatively, a draw-rod bushing replaces a portion of the winding cable 141 with a solid rod (FIG. 6).

The bushing housing 123, as shown in FIGS. 3-5 and 8, includes an upper housing 124 and a lower housing 125. The upper housing 124 includes a weathershed 126 that has a plurality of outwardly extending fins 127. The lower housing 125 includes a flange 128 for securing the bushing 121 to the transformer housing 117. A portion of the lower housing 125 passes through an opening 118 in the transformer housing 117 to be disposed within the housing. Fasteners 119, such as bolts, can be used to secure the bushing 121 to the transformer housing 117.

The bushing tube 131 extends through the bushing 121 from an upper end 122 to a lower end 129, as shown in FIGS. 3-5 and 8. The bushing tube 131 has an outer surface 132 and an inner surface 133, and is hollow along its entire length. A threaded portion 135 is formed on the outer surface 132 of the tube 131 proximal a first end 134. An opening 136 is formed through the threaded portion 135 to receive a locking pin 105 to secure the draw-lead cable 141 to the tube 131. A threaded portion 137 is formed on an outer surface 132 of the tube 131 proximal a second end 138.

Figures 6, 7, 8:
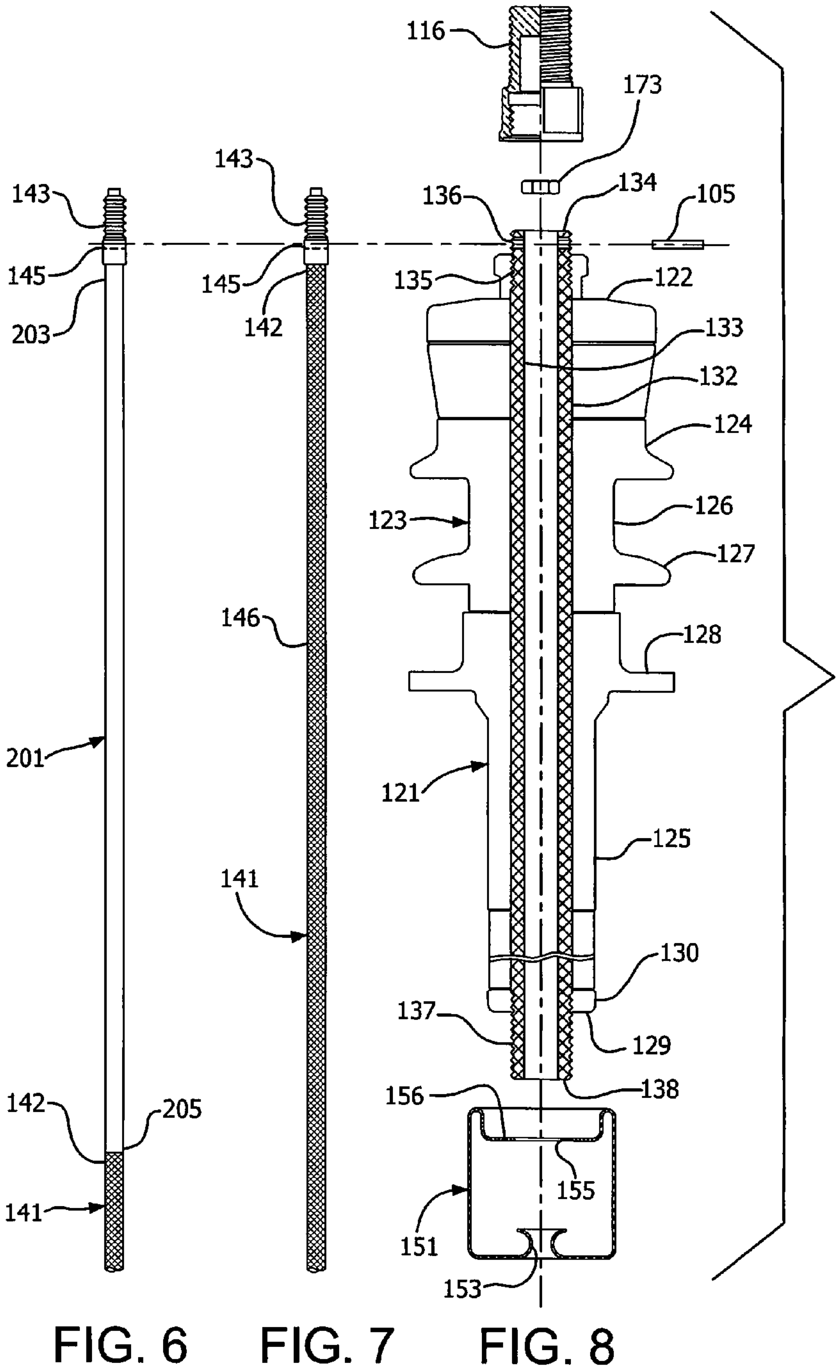
FIG. 6 is a side elevational view of a draw-rod for a high-voltage bushing.
FIG. 7 is a side elevational view of a draw-lead cable for a high-voltage bushing.
FIG. 8 is an exploded side elevational view in partial section of a high-voltage bushing and a contact member of FIG. 4.
Figure 9:
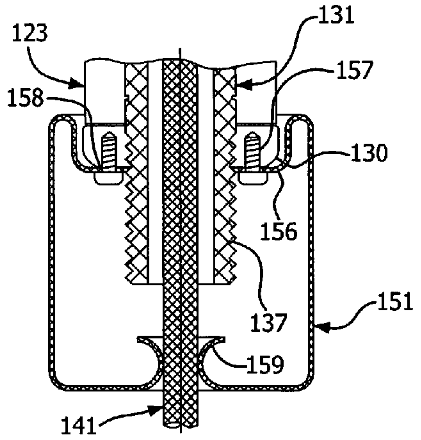
FIG. 9 is a partial side elevational view in partial section of the contact member of FIG. 4.

The draw-lead, or winding, cable 141 has a first end 142 having a draw-lead terminal 143 secured thereto, as shown in FIG. 7. A second end 144 of the cable 141 is connected to the windings disposed within the transformer coil and core assembly 113 in the transformer housing 117. An opening 145 is formed in the draw-lead terminal 143 to receive the locking pin 105. Preferably, the cable 141 is made of stranded copper wire. As shown in FIG. 7, the cable 141 is preferably not insulated.

Alternatively, a draw-rod 201 can be used, as shown in FIG. 6. A first end 203 of the rod 201 is connected to the terminal 145. A second end 205 of the rod 201 is connected to the first end 142 of the draw-lead cable 141.

Figure 15:
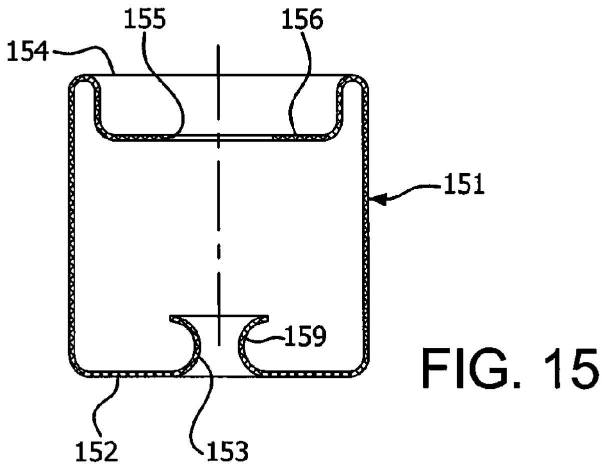
FIG. 15 is a side elevational view in cross section of the contact member of FIG. 13.

The electrically conductive contact member 151, as shown in FIGS. 3-5, 8, 9 and 13-15, is substantially cylindrical. A first opening 153 is formed in a first end 152 of the contact member 151, and a second opening 155 is formed in a second end 154 of the contact member. The first opening 153 has a diameter that is preferably less than an outer diameter of the cable 141 forming an interference fit to facilitate contact between the contact member 151 and the cable 141 at the first opening 153. The first opening 153 is formed by an axially inwardly extending annular projection 159 having a substantially C-shaped cross-section, as shown in FIG. 15. The second opening 155 has a diameter such that an edge 150 of the opening 155 receives the tube 131 and is fastened to the second end 129 providing an electrical connection therebetween. An annular shoulder 156 spaced inwardly from the second end 154 of the contact member 151. Preferably, the second opening 155 is formed in the shoulder 156. Fastener holes 158 formed in the shoulder 156 receive fasteners 157 to secure the contact member 131 to the bushing housing 123, such as to the end cap 130 shown in FIG. 9.

The contact member is preferably made of copper, although any suitable material may be used that has good electrical conductivity. The first opening 153 of the contact member 151 can be flexible to facilitate maintaining a contact relationship between the contact member 151 and the cable 141.

Assembly and Operation

The fully assembled draw-lead high-voltage bushing 121 is shown secured to the transformer 111 in FIG. 3. The metallic contact member 151 is connected to the bushing tube 131 of the high-voltage bushing 121 proximal the second end 138 of the tube 131. The draw-lead cable 141 is connected to the first end 134 of the tube 131. The draw-lead cable 141 contacts the contact member 151, thereby substantially preventing spark-over between the draw-lead cable 141 and the tube 131.

As described above, the draw-lead bushing 121 can be connected to the transformer 111 in a factory. The draw-lead terminal 143 is connected to the first end 142 of the draw-lead cable in a conventional manner. The bushing 121 is lifted up with a crane vertically and lowered with its second end 129 close to, but still above, the transformer turret (opening) 118.

The contact member 151 is then connected to the second end 129 of the bushing 121. The second end 138 of the bushing tube 131 is received by the second opening 155 in the contact member 151. The contact member 151 is engaged with the bushing tube 131 such that the shoulder 156 abuts the second end 129 of the bushing 121. Fasteners 157 are inserted through fastener holes 158 in the contact member 151 to secure the contact member to the second end 129 of the bushing 121. The second opening 155 of the contact member 151 does not contact the draw-lead cable 141.

Figure 5:
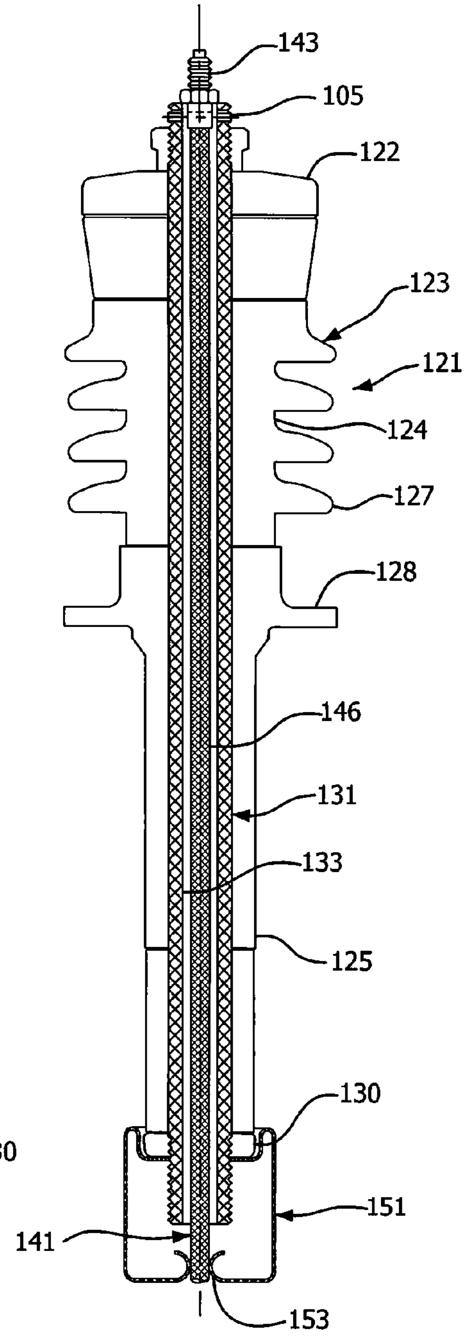
FIG. 5 is a side elevational view in section of the bushing of FIG. 3 after installation of the draw-lead cable.

A rope 107 is dropped down through the bushing tube 131 and tightened to the draw-lead terminal 143. As the bushing 121 is further lowered down into the transformer housing 117, the rope 107 is pulled up to guide the draw-lead cable 141 through the bushing tube 131. The draw-lead cable 141 is pulled upwardly through the first opening 153 in the contact member 151. The draw-lead cable 141 is bare, or uninsulated, thereby ensuring full electrical contact between the draw-lead cable 141 and the contact member 151. An insulated draw-lead cable 141 can be used if the insulation is removed from the area of the cable that contacts the contact member 151, thereby ensuring full electrical contact. As shown in FIG. 5, an outer surface 146 of the draw-lead cable 141 is spaced from the inner surface 133 of the bushing tube 131 between the draw-lead terminal 143 and the contact area of the draw-lead cable with the contact member 151.

The bushing flange 128 is then bolted to the transformer housing 117 and the draw-lead terminal 143 is connected to the first end 134 of the bushing tube 131. The locking pin 105 is inserted through the aligned openings 136 and 145 in the tube 131 and draw-lead cable 141, respectively, to mechanically and electrically connected the draw-lead cable 141 to the first end 134 of the tube 131. A nut 173 is threadably engaged with the draw-lead cable terminal 143 to secure the cable 141 to the bushing tube 131. A gasket, or o-ring, is disposed between the bushing flange 128 and the transformer housing 117. The bushing upper terminal 116 connected to the first end 122 of the bushing 121 connects the bushing 121 to an external power line 101 or testing cable.

To remove the high-voltage bushing 121 for shipment of the transformer 111, the draw-lead terminal 143 is disconnected from the bushing tube 131. The draw-lead cable 141 is then lowered into the transformer housing 117, and the bushing flange 128 is unfastened from the transformer housing 117. The bushing 121 is then removable from the transformer 111. The same installation process described above is then followed to connect the high-voltage bushing 121 in the field, except that the draw-lead cable 141 is already connected to the draw-lead terminal 143 such that the installer does not need to be inside the transformer housing 117.

The draw-lead terminal 143 provides full electrical contact between the draw-lead cable 141 and the bushing tube 131 at the first end 122 of the bushing 121. The contact member 151 provides full electrical contact between the draw-lead cable 141 and the bushing tube 131 at the second end 129 of the bushing 121. The contact member 151 substantially eliminates the potential difference between the draw-lead cable 141 and the bushing tube 131. Therefore, spark-over, or arcing, between the draw-lead cable 141 and the bushing tube 131 during the lightning or switching surges is substantially prevented.

As shown in FIGS. 4, 5, 8 and 9, the contact member 151 can be secured to an end cap 130 by the fasteners 157 before being connected to the bushing 121. After connecting the contact member 151, the end cap 130 is then threadably engaged with the threaded portion 137 of the bushing tube 131. The second opening 155 in the contact member 151 receives the bushing tube 131. An electrical connection is formed between the tube 131, the end cap 130 and the contact member 151.

Alternatively, as shown in FIG. 6, the draw-rod 201 can be connected between the first end 142 of the draw-lead cable 141 and the draw-lead terminal 143. The installation of the draw-rod bushing is substantially similar to that of the draw-lead cable bushing 121. The bushing tube 131 can also be used as a conductor to carry the current through the bushing.

The installation of the contact member 151 can be done in the transformer factory or in the field. Preferably, the contact member 151 is connected to the bushing 121 prior to pulling the draw-lead cable 141 through the bushing tube 131.

The contact member 151 fully contacts the draw-lead cable 141 when the draw-lead cable is pulled through the contact member 151. To ensure good physical and electrical contact between the draw-lead cable 141 and the contact member 151, the contact member 151 can be flexible and the first opening 153 can be made slightly smaller than the diameter of the draw-lead cable 141. Additionally, a plurality of small springs can be inserted and compressed between the metallic contact member 151 and the draw-lead cable 141 to ensure good electrical contact between the draw-lead cable 141 and the bushing tube 131.

Figure 10:
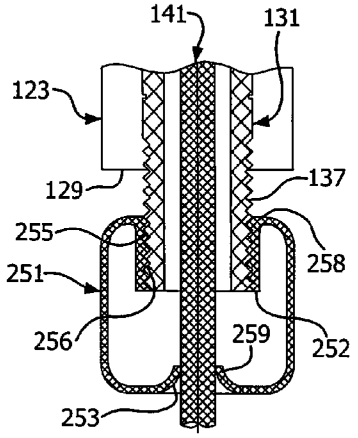
FIG. 10 is a partial side elevational view in partial section of a contact member in accordance with a second exemplary embodiment of the present invention.
Figure 11:
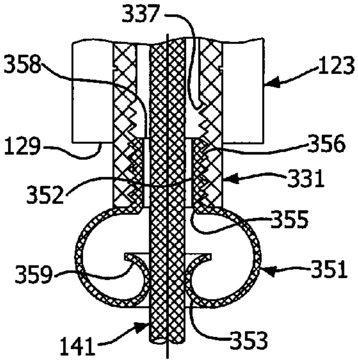
FIG. 11 is a partial side elevational view in partial section of a contact member in accordance with a third exemplary embodiment of the present invention.
Figure 12:
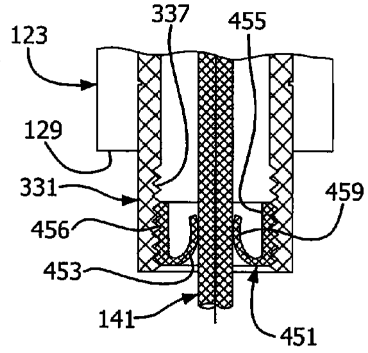
FIG. 12 is a partial side elevational view in partial section of a contact member in accordance with a fourth exemplary embodiment of the present invention.
Figure 13:
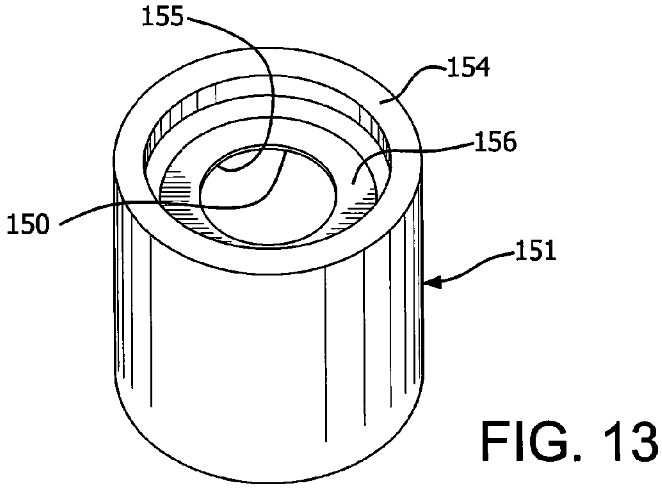
FIG. 13 is an upper perspective view of the contact member of FIG. 4.
Figure 14:
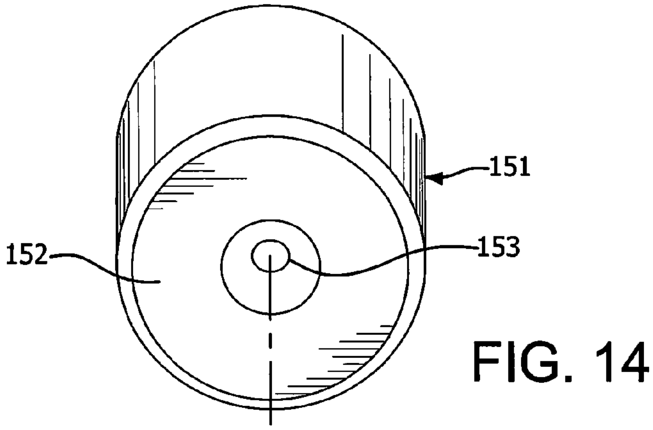
FIG. 14 is a lower perspective view of the contact member of FIG. 13.

Alternative embodiments of the contact member 151 are shown in FIGS. 10-12. A contact member 251 according to a second exemplary embodiment of the present invention, as shown in FIG. 10, has a first opening 253 to receive the draw-lead cable 141 formed by an axially inwardly extending projection 259. The diameter of the first opening 253 is preferably less than the diameter of the draw-lead cable 141 to facilitate contact therewith. A second opening 255 is formed by an axially inwardly extending annular projection 252. An inner surface 256 of the projection 252 is threaded to engage the threaded portion 137 of the bushing tube 131. An upper end 258 of the contact member 251 is axially spaced from the second end 129 of the bushing housing 123. The second opening 255 of the contact member 251 does not contact the draw-lead cable 141.

A contact member 351 in accordance with a third exemplary embodiment of the present invention, as shown in FIG. 11, has a first opening 353 to receive the draw-lead cable 141 formed by an axially inwardly extending annular projection 359. The projection 359 has a substantially C-shaped cross section. The diameter of the first opening 353 is preferably less than the diameter of the draw-lead cable 141 to facilitate contact therewith. A second opening 355 is formed by an axially outwardly extending annular projection 352. An outer surface 356 of the projection 352 is threaded to engage a threaded portion 337 of a bushing tube 331. An upper end 358 is disposed within the bushing tube 331. The second opening 355 of the contact member 351 does not contact the draw-lead cable 141.

A contact member 451 in accordance with a fourth exemplary embodiment of the present invention, as shown in FIG. 12, has a first opening 453 to receive the draw-lead cable 141 formed by an axially inwardly extending annular projection 459. The diameter of the first opening 453 is preferably less than the diameter of the draw-lead cable 141 to facilitate contact therewith. A second opening 455 is formed at an opposite annular end of the contact member 451. An outer surface 456 of the contact member 451 is threaded to engage a threaded portion 337 of a bushing tube 331. The entirety of the contact member 451 is disposed within the bushing tube 331. The second opening 455 of the contact member 451 does not contact the draw-lead cable 141.

While advantageous embodiments have been chosen to illustrate the invention, it will be understood by those skilled in the art that various changes and modifications may be made therein without departing from the scope of the invention as defined in the appended claims.

What is claimed is:

1. A high-voltage bushing, comprising:
- a housing;
- a tube disposed within said housing and having first and second ends;
- a conductor disposed within and radially spaced from said tube, said conductor being electrically connected to said first end of said tube; and
- an electrically conductive contact member connected to said tube proximal said second end thereof and having a first opening receiving and directly contacting said conductor providing an electrical connection between said conductor and said second end of said tube.

2. A high-voltage bushing according to claim 1, wherein said conductor has a first end connected to said first end of said tube.

3. A high-voltage bushing according to claim 2, wherein a second end of said conductor extends externally of said contact member.

4. A high-voltage bushing according to claim 1, wherein said conductor is uninsulated.

5. A high-voltage bushing according to claim 1, wherein said conductor is a flexible cable.

6. A high-voltage bushing according to claim 1, wherein said conductor includes a solid, hollow or semi-flexible rod.

7. A high-voltage bushing according to claim 1, wherein said contact member threadably engages said tube.

8. A high-voltage bushing according to claim 1, wherein said contact member is secured to said bushing housing by fasteners.

9. A high-voltage bushing according to claim 1, wherein said contact member is resilient.

10. A high-voltage bushing according to claim 9, wherein said contact member opening has a diameter smaller than an outer diameter of said conductor.

11. A high-voltage bushing according to claim 1, wherein said contact member is disposed entirely within said tube.

12. A high-voltage bushing according to claim 1, wherein said contact member does not directly contact said housing.

13. A high-voltage bushing according to claim 1, wherein a second opening defined by an annular part of said contact member engages said tube, said first and second openings being connected to allow passage of said conductor therethrough.

14. A high-voltage bushing according to claim 13, wherein said second opening threadably engages an outer surface of said tube.

15. A high-voltage bushing according to claim 13, wherein said second opening threadably engages an inner surface of said tube.

16. A high-voltage bushing according to claim 13, wherein said contact member is made of copper.

17. A method of assembling a high-voltage bushing, comprising:
- connecting an electrically conductive contact member to a tube of a high-voltage bushing proximal a second end of the tube;
- passing a conductor through the tube and providing a radial space therebetween; and
- contacting the conductor with the contact member to provide an electrical connection between the conductor and the tube through the contact member.

18. The method of assembling a high-voltage bushing according to claim 17, wherein
- the contact member is connected to the tube before connecting the conductor to the tube.

19. The method of assembling a high-voltage bushing according to claim 17, wherein
- the conductor is pulled through the contact member and the tube to connect the conductor to the first end of the tube.

20. The method of assembling a high-voltage bushing according to claim 17, wherein
- the contact member is threadably engaged with the tube.

* * * * *